(12) United States Patent
Means et al.

(10) Patent No.: US 11,637,777 B2
(45) Date of Patent: Apr. 25, 2023

(54) MANAGING PREFIX LISTS AT EDGE DEVICES

(71) Applicant: AT&T Intellectual Property I, L.P., Atlanta, GA (US)

(72) Inventors: Israel Means, Chula Vista, CA (US); Mark Lyn, Tampa, FL (US); Brian Freeman, Farmingdale, NJ (US); Tuan Duong, Eatontown, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/164,224

(22) Filed: Feb. 1, 2021

(65) Prior Publication Data

US 2022/0247685 A1 Aug. 4, 2022

(51) Int. Cl.
*H04L 45/748* (2022.01)
*H04L 43/16* (2022.01)
*H04L 47/10* (2022.01)
*H04L 45/00* (2022.01)

(52) U.S. Cl.
CPC ............ *H04L 45/748* (2013.01); *H04L 43/16* (2013.01); *H04L 45/54* (2013.01); *H04L 47/10* (2013.01)

(58) Field of Classification Search
CPC ....... H04L 45/748; H04L 43/16; H04L 45/54; H04L 47/10
USPC ................................ 370/392, 400, 241, 230
See application file for complete search history.

(56) References Cited

U.S. PATENT DOCUMENTS

| | | | | |
|---|---|---|---|---|
| 8,681,614 | B1* | 3/2014 | McCanne | H04L 47/522 |
| | | | | 370/230 |
| 9,577,925 | B1* | 2/2017 | Bahadur | H04L 45/50 |
| 9,979,650 | B1* | 5/2018 | Sheth | H04L 12/66 |
| 2010/0046377 | A1* | 2/2010 | Ryan | H04L 41/0681 |
| | | | | 370/241 |
| 2014/0119379 | A1* | 5/2014 | Liang | H04L 45/54 |
| | | | | 370/400 |

* cited by examiner

*Primary Examiner* — Kwang B Yao
*Assistant Examiner* — Syed M Bokhari
(74) *Attorney, Agent, or Firm* — Hartman & Citrin LLC

(57) ABSTRACT

Managing prefix lists at edge devices can include detecting, at an edge device, a traffic flow that can include a packet that specifies a destination address. The edge device can measure a bandwidth associated with the traffic flow, identify a flow bandwidth threshold defined for the edge device, and determine if the bandwidth associated with the traffic flow satisfies the flow bandwidth threshold. If a determination is made that the bandwidth associated with the traffic flow satisfies the flow bandwidth threshold, the edge device can include the destination address in a prefix list stored at the edge device. If a determination is made that the bandwidth associated with the traffic flow does not satisfy the flow bandwidth threshold, the edge device can omit the destination address from the prefix list stored at the edge device.

20 Claims, 7 Drawing Sheets

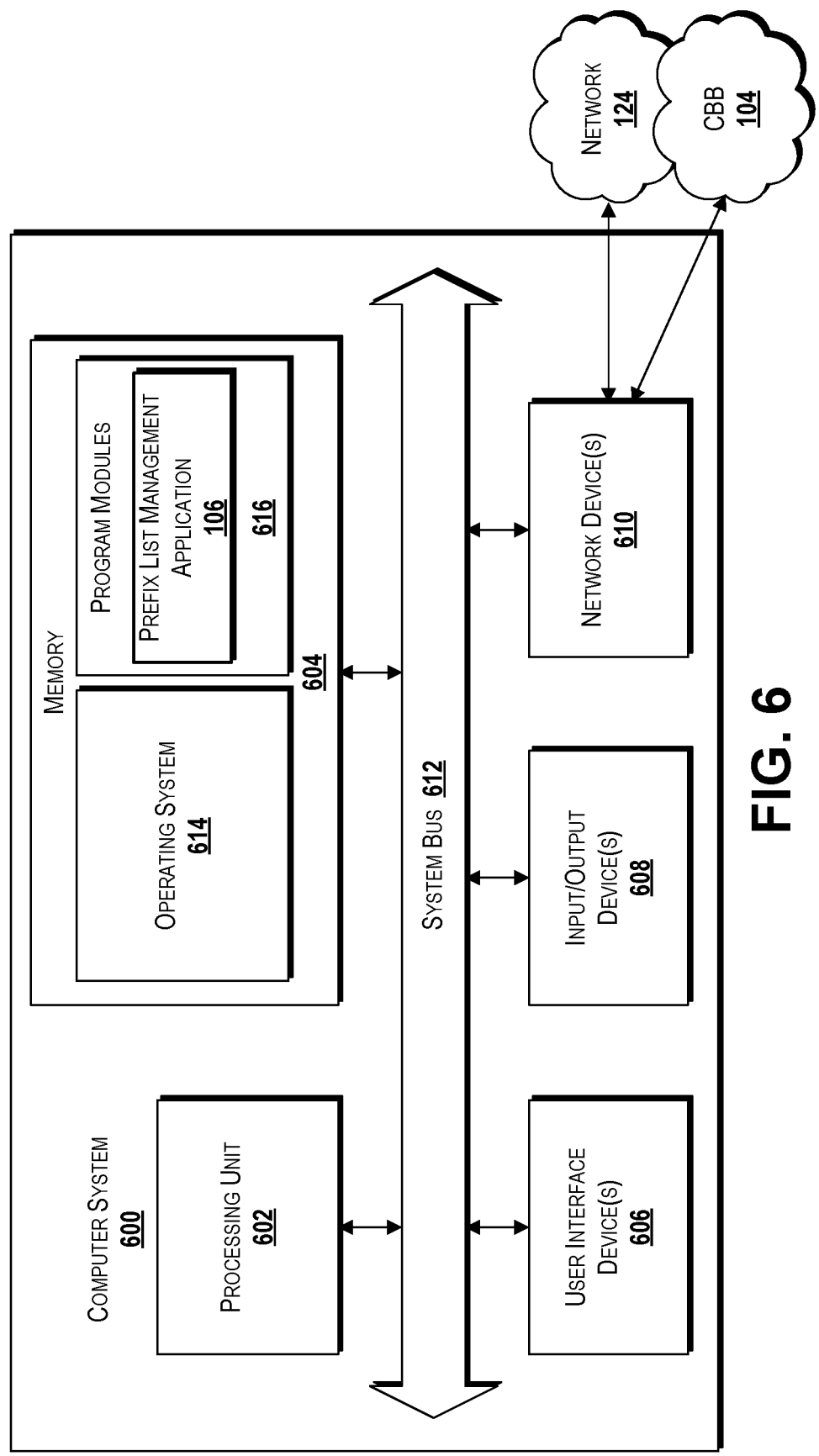

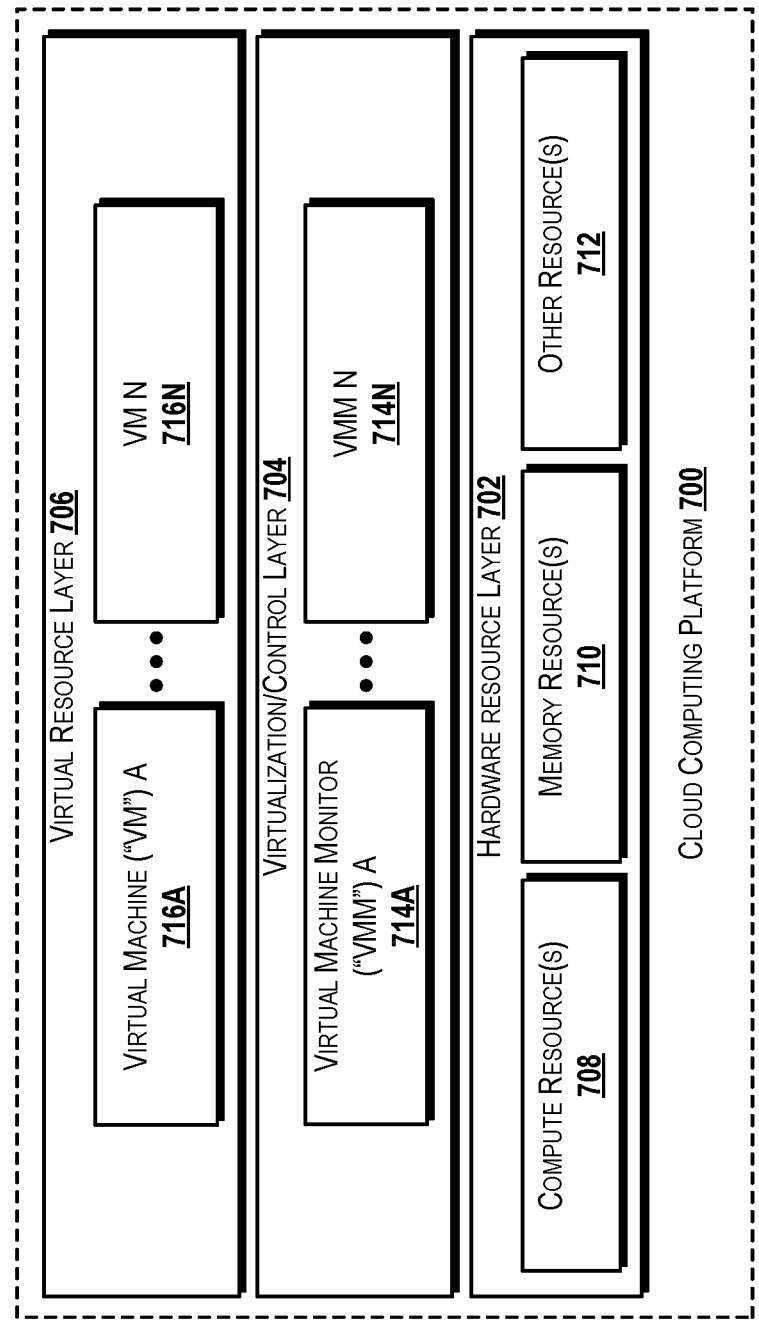

MANAGING PREFIX LISTS AT EDGE DEVICES

BACKGROUND

In computer networking, the term "routing" is generally used to refer to matching an address (e.g., an IP address) to a destination specified in a data flow, and forwarding the data associated with the data flow to the destination. As computer networking continues growing, some challenges to the traditional routing approaches have been presented. One challenge that has been presented is based on the scale required for such routing techniques.

In particular, as routing tables, forwarding information bases, routing information bases, border gateway protocol ("BGP") tables, prefix lists, and/or other forms of routing tables can store millions of routes or paths ("routes"), some routing equipment may not be able to support such a large data structure and/or may not be able to efficiently use such a large data structure. Furthermore, some routing equipment may not use all entries in the data structures, so storing and accessing these large data structures may waste processing, transmission, and data storage resources.

SUMMARY

The present disclosure is directed to managing prefix lists at edge devices. In networks, different traffic (e.g., data) flows may vary with respect to one another in terms of bandwidth consumed by those traffic flows. The variation may be based on the particular destinations associated with these traffic flows. For example, some destinations may generate a large proportion of bandwidth for a certain routing device (e.g., an edge device such as an edge router), whereas bandwidth consumed by the same edge device to route traffic to other destinations may remain relatively low.

For example, an edge device that routes traffic to a video website and a news website may cross a predefined and tunable higher bandwidth threshold associated with traffic flows to the video website. Higher bandwidth can be associated with more packets, and therefore according to some embodiments of the concepts and technologies disclosed herein, flows associated with higher bandwidth (relative to other flows that may have lower bandwidth) may benefit from ready access to routing information. Embodiments of the concepts and technologies disclosed herein can be configured to address this disparity by managing prefix lists to maintain a relatively small prefix list by applying a dynamic BGP policy mechanism by way of a prefix list management application that can consider bandwidth utilization per traffic flow. Thus, embodiments of the concepts and technologies disclosed herein can be used to reduce the size of the prefix list or other BGP table or data structure. In some embodiments, an edge device or other routing equipment can limit its BGP table (e.g., a prefix list) to addresses and/or routes that satisfy a defined bandwidth threshold. The prefix list (e.g., a local BGP routing information base ("RIB")) can be dynamically updated with destination paths that consume bandwidth that meets or exceeds the defined threshold. Routes, paths, or addresses for which flows do not meet or exceed the bandwidth threshold may not be imported into the local BGP table, or can be removed from the BGP table. To reach designations that are not stored locally, a default route to a regional gateway router can be imported. The regional gateway router can be configured to store the full Internet table and resolve paths that followed the default path.

In some embodiments, one or more edge devices can be located on a network or a portion of a network. In some embodiments, for example, the one or more edge devices can be located on a common backbone of a communications network such as, for example, a carrier network, a provider network, or the like. The common backbone can also be in communication with another network such as, for example, the Internet. In some embodiments, the common backbone can include one or more gateways, which can also be configured for routing of network traffic to and/or from the common backbone. One or more of the edge devices can be configured to execute an instance of the prefix list management application. The prefix list management application can be configured to manage a prefix list associated with a respective edge device. Instead of each edge device storing a common prefix list that reflects all possible routes for a networking environment, some embodiments of the concepts and technologies disclosed herein can enable the management and/or optimization of a prefix list stored at an associated edge device.

In particular, a route reflector or other functionality associated with a communications network (e.g., a carrier network or provider network) can be configured to send route data to one or more of the edge devices. In some embodiments, for example, the route reflector can be configured to publish releases of the route data at intervals, when any route change is detected by the route detector (e.g., via state change messages, route change messages, or the like), in response to events, and/or at other times and/or under other circumstances. The route data can represent and/or define all routes associated with the networking environment (e.g., all routes associated with the devices operating on the common backbone and/or other routes). As explained above, the route data can define thousands, hundreds of thousands, or even millions of routes. Storing and/or accessing a prefix list that defines all routes for a common backbone and/or other networking environment can consume large amounts of processing and/or data storage resources associated with the edge devices, and therefore can negatively impact performance of the edge devices. Furthermore, a particular edge device may only route traffic to or along a small number of routes, in practice.

Embodiments of the concepts and technologies disclosed herein can enable management of the prefix lists at the edge devices. The edge devices can execute a prefix list management application that can be configured to manage the prefix lists. In particular, one or more of the edge devices can execute the prefix list management application to monitor communications associated with the edge devices. The prefix list management application can be configured to apply one or more flow bandwidth thresholds to the monitored traffic, for example, by considering only traffic that exceeds a set percentage of all traffic associated with the edge device.

According to various embodiments of the concepts and technologies disclosed herein, the prefix list management application can identify destination addresses that account for the defined levels of routing at that edge device, and can add a route associated with the destination addresses that account for the defined levels of routing to the prefix list associated with the edge device. Similarly, any routes in the prefix list that are not associated with a destination address that accounts for the defined levels of routing for a particular edge device can be removed or pruned from the prefix list of that particular edge device. As such, in an example of ten percent as the flow bandwidth threshold, it can be appreciated that no more than ten entries will exist in the prefix list associated with a particular edge device. Thus, it can be appreciated that a prefix list having millions of routes or more may be reduced by embodiments of the concepts and technologies disclosed herein to a prefix list having only ten or less routes. Thus, savings in processing and data storage resource usages can be realized by some embodiments of the concepts and technologies disclosed herein.

Various embodiments of the concepts and technologies disclosed herein can include a gateway that can be configured to store a complete prefix list. In particular, the gateway can be configured to receive the route data from the route reflector at various times, and to update its complete prefix list based on the releases of the route data to ensure that all routes are reflected by the complete prefix list. Thus, if a particular edge device receives a traffic flow that is intended for delivery to a particular destination device for which a destination address or route is not included in the associated prefix list, the edge device can be configured to route the traffic flow to the gateway, the gateway can identify routing for the traffic flow, and the gateway can route the traffic flow to the destination device using the information included in the complete prefix list. Thus, performance of the edge devices can be improved without affecting delivery of traffic associated with traffic flows.

According to one aspect of the concepts and technologies disclosed herein, a system is disclosed. The system can include an edge device having a processor and a memory. The memory can store computer-executable instructions that, when executed by the processor, cause the processor to perform operations. The operations can include detecting a traffic flow, where the traffic flow can include a packet that can specify a destination address. The operations further can include measuring a bandwidth associated with the traffic flow, identifying a flow bandwidth threshold defined for the edge device, the flow bandwidth threshold including a percentage of a total bandwidth of the edge device, and determining if the bandwidth associated with the traffic flow satisfies the flow bandwidth threshold. If a determination is made that the bandwidth associated with the traffic flow satisfies the flow bandwidth threshold, the operations further can include including the destination address in a prefix list stored at the edge device. If a determination is made that the bandwidth associated with the traffic flow does not satisfy the flow bandwidth threshold, the operations further can include omitting the destination address from the prefix list stored at the edge device.

In some embodiments, the bandwidth can include a count of packets included in the traffic flow. In some embodiments, the bandwidth can include a count of packets associated with the traffic flow and a further count of packets associated with a further traffic flow that can include a further packet that can specify the destination address. In some embodiments, including the destination address in the prefix list can include adding the destination address to the prefix list. In some embodiments, omitting the destination address from the prefix list can include removing the destination address from the prefix list.

In some embodiments, the computer-executable instructions, when executed by a processor, cause the processor to perform operations further including receiving a further packet; identifying a further destination address for the further packet; determining if the further destination address is included in the prefix list; if a determination is made that the further destination address is included in the prefix list, routing the further packet to a destination device associated with the further destination address; and if a determination is made that the further destination address is not included in the prefix list, routing the further packet to a gateway device. The gateway device can be configured to route the further packet in accordance with routing information stored in a complete prefix list stored at the gateway.

In some embodiments, the computer-executable instructions, when executed by a processor, cause the processor to perform operations further including detecting a change to the prefix list; determining if the change has previously been made to the prefix list; and in response to a determination that the change has previously been made to the prefix list, taking an action to limit a future iteration of the same change.

According to another aspect of the concepts and technologies disclosed herein, a method is disclosed. The method can include detecting, at an edge device that comprises a processor, a traffic flow. The traffic flow can include a packet that can specify a destination address. The method further can include measuring, by the edge device, a bandwidth associated with the traffic flow; identifying, by the edge device, a flow bandwidth threshold defined for the edge device, the flow bandwidth threshold including a percentage of a total bandwidth of the edge device; and determining, by the edge device, if the bandwidth associated with the traffic flow satisfies the flow bandwidth threshold. If a determination is made that the bandwidth associated with the traffic flow satisfies the flow bandwidth threshold, the method further can include including, by the edge device, the destination address in a prefix list stored at the edge device. If a determination is made that the bandwidth associated with the traffic flow does not satisfy the flow bandwidth threshold, the method further can include omitting, by the edge device, the destination address from the prefix list stored at the edge device.

In some embodiments, the bandwidth can include a count of packets included in the traffic flow. In some embodiments, the bandwidth can include a count of packets associated with the traffic flow and a further count of packets associated with a further traffic flow that can include a further packet that can specify the destination address. In some embodiments, including the destination address in the prefix list can include adding the destination address to the prefix list. In some embodiments, omitting the destination address from the prefix list can include removing the destination address from the prefix list.

In some embodiments, the method can further include receiving a further packet; identifying a further destination address for the further packet; determining if the further destination address is included in the prefix list; if a determination is made that the further destination address is included in the prefix list, routing the further packet to a destination device associated with the further destination address; and if a determination is made that the further destination address is not included in the prefix list, routing the further packet to a gateway device. The gateway device can be configured to route the further packet in accordance with routing information stored in a complete prefix list stored at the gateway. In some embodiments, the method can further include detecting a change to the prefix list; determining if the change has previously been made to the prefix list; and in response to a determination that the change has previously been made to the prefix list, taking an action to limit a future iteration of the same change.

According to yet another aspect of the concepts and technologies disclosed herein, a computer storage medium is disclosed. The computer storage medium can store computer-executable instructions that, when executed by a processor, cause the processor to perform operations. The operations can include detecting a traffic flow, where the traffic flow can include a packet that can specify a destination address. The operations further can include measuring a bandwidth associated with the traffic flow, identifying a flow bandwidth threshold defined for the edge device, the flow bandwidth threshold including a percentage of a total bandwidth of the edge device, and determining if the bandwidth associated with the traffic flow satisfies the flow bandwidth threshold. If a determination is made that the bandwidth associated with the traffic flow satisfies the flow bandwidth threshold, the operations further can include including the destination address in a prefix list stored at the edge device. If a determination is made that the bandwidth associated with the traffic flow does not satisfy the flow bandwidth threshold, the operations further can include omitting the destination address from the prefix list stored at the edge device.

In some embodiments, the bandwidth can include a count of packets included in the traffic flow. In some embodiments, the bandwidth can include a count of packets associated with the traffic flow and a further count of packets associated with a further traffic flow that can include a further packet that can specify the destination address. In some embodiments, including the destination address in the prefix list can include adding the destination address to the prefix list. In some embodiments, omitting the destination address from the prefix list can include removing the destination address from the prefix list.

In some embodiments, the computer-executable instructions, when executed by a processor, cause the processor to perform operations further including receiving a further packet; identifying a further destination address for the further packet; determining if the further destination address is included in the prefix list; if a determination is made that the further destination address is included in the prefix list, routing the further packet to a destination device associated with the further destination address; and if a determination is made that the further destination address is not included in the prefix list, routing the further packet to a gateway device. The gateway device can be configured to route the further packet in accordance with routing information stored in a complete prefix list stored at the gateway.

In some embodiments, the computer-executable instructions, when executed by a processor, cause the processor to perform operations further including detecting a change to the prefix list; determining if the change has previously been made to the prefix list; and in response to a determination that the change has previously been made to the prefix list, taking an action to limit a future iteration of the same change. In some embodiments, taking the action can include tracking a time associated with the change, where the future iteration of the same change is not made before a defined time has passed since the change; counting releases of traffic flows, where the future iteration of the same change is not made before a defined number of traffic flows have been detected since the change; or requiring a bandwidth to satisfy the flow bandwidth threshold by a defined amount before the future iteration of the change is made.

Other systems, methods, and/or computer program products according to embodiments will be or become apparent to one with skill in the art upon review of the following drawings and detailed description. It is intended that all such additional systems, methods, and/or computer program products be included within this description and be within the scope of this disclosure.

BRIEF DESCRIPTION OF THE DRAWINGS

FIG. 6 is a block diagram illustrating an example computer system configured to enable managing prefix lists at edge devices, according to some illustrative embodiments of the concepts and technologies described herein.

FIG. 7 is a diagram illustrating a computing environment capable of implementing aspects of the concepts and technologies disclosed herein, according to some illustrative embodiments of the concepts and technologies described herein.

DETAILED DESCRIPTION

Figure 1:
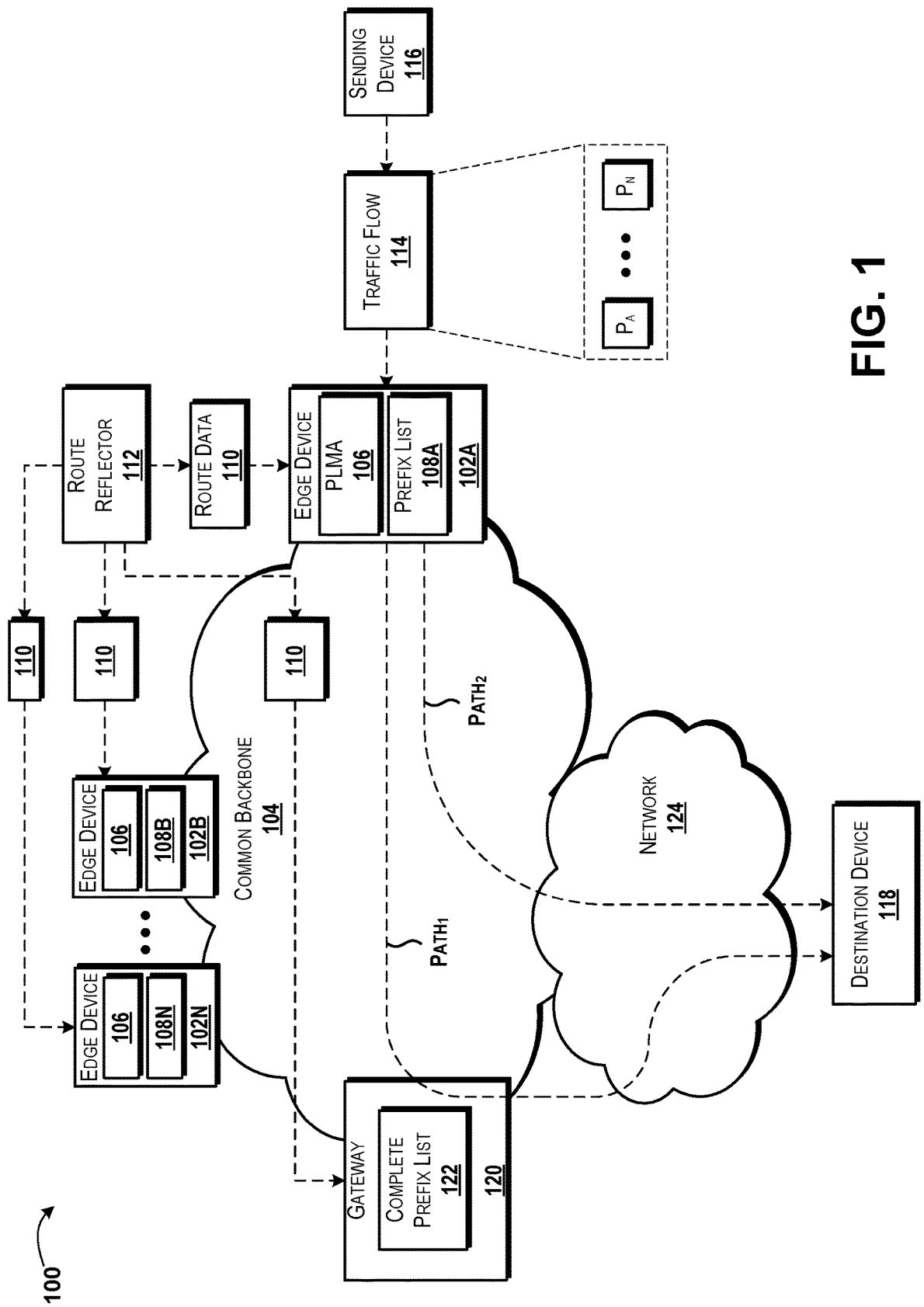
FIG. 1 is a system diagram illustrating an illustrative operating environment for various embodiments of the concepts and technologies described herein.

The following detailed description is directed to managing prefix lists at edge devices. One or more edge devices can be located on a network or a portion of a network. In some embodiments, for example, the one or more edge devices can be located on a common backbone of a communications network such as, for example, a carrier network, a provider network, or the like. The common backbone can also be in communication with another network such as, for example, the Internet. In some embodiments, the common backbone can include one or more gateways which can also be configured for routing of network traffic to and/or from the common backbone. One or more of the edge devices can be configured to execute an instance of the prefix list management application. The prefix list management application can be configured to manage a prefix list associated with a respective edge device. Instead of each edge device storing a common prefix list that reflects all possible routes for a networking environment, some embodiments of the concepts and technologies disclosed herein can enable the management and/or optimization of a prefix list stored at an associated edge device.

In particular, a route reflector or other functionality associated with a communications network (e.g., a carrier network or provider network) can be configured to send route data to one or more of the edge devices. In some embodiments, for example, the route reflector can be configured to publish releases of the route data at intervals, when any route change is detected by the route detector (e.g., via state change messages, route change messages, or the like), in response to events, and/or at other times and/or under other circumstances. The route data can represent and/or define all routes associated with the networking environment (e.g., all routes associated with the devices operating on the common backbone and/or other routes). As explained above, the route data can define thousands, hundreds of thousands, or even millions of routes. Storing and/or accessing a prefix list that defines all routes for a common backbone and/or other networking environment can consume large amounts of processing and/or data storage resources associated with the edge devices, and therefore can negatively impact performance of the edge devices. Furthermore, a particular edge device may only route traffic to or along a small number of routes, in practice.

Embodiments of the concepts and technologies disclosed herein can enable management of the prefix lists at the edge devices. The edge devices can execute a prefix list management application that can be configured to manage the prefix lists. In particular, one or more of the edge devices can execute the prefix list management application to monitor communications associated with the edge devices. The prefix list management application can be configured to apply one or more flow bandwidth thresholds to the monitored traffic, for example, by considering only traffic that exceeds a set percentage of all traffic associated with the edge device.

According to various embodiments of the concepts and technologies disclosed herein, the prefix list management application can identify destination addresses that account for the defined levels of routing at that edge device, and can add a route associated with the destination addresses that account for the defined levels of routing to the prefix list associated with the edge device. Similarly, any routes in the prefix list that are not associated with a destination address that accounts for the defined levels of routing for a particular edge device can be removed or pruned from the prefix list of that particular edge device. As such, in an example of ten percent as the flow bandwidth threshold, it can be appreciated that no more than ten entries will exist in the prefix list associated with a particular edge device. Thus, it can be appreciated that a prefix list having millions of routes or more may be reduced by embodiments of the concepts and technologies disclosed herein to a prefix list having only ten or less routes. Thus, savings in processing and data storage resource usages can be realized by some embodiments of the concepts and technologies disclosed herein.

Various embodiments of the concepts and technologies disclosed herein can include a gateway that can be configured to store a complete prefix list. In particular, the gateway can be configured to receive the route data from the route reflector at various times, and to update its complete prefix list based on the releases of the route data to ensure that all routes are reflected by the complete prefix list. Thus, if a particular edge device receives a traffic flow that is intended for delivery to a particular destination device for which a destination address or route is not included in the associated prefix list, the edge device can be configured to route the traffic flow to the gateway, the gateway can identify routing for the traffic flow, and the gateway can route the traffic flow to the destination device using the information included in the complete prefix list. Thus, performance of the edge devices can be improved without affecting delivery of traffic associated with traffic flows.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for managing prefix lists at edge devices will be described, according to an illustrative embodiment. The operating environment 100 shown in FIG. 1 includes one or more edge devices 102A-N (hereinafter collectively and/or generically referred to as "edge devices 102"). The edge devices 102 can operate in communication with and/or as part of a common backbone or core network (hereinafter referred to as a "common backbone" or "CBB") 104, though this is not necessarily the case. According to various embodiments of the concepts and technologies disclosed herein, the common backbone 104 can correspond to an operational and/or core network of a provider network (e.g., a telecommunications network), though this is not necessarily the case.

According to various embodiments, the functionality of one or more of the edge devices 102 may be provided by one or more server computers, desktop computers, mobile telephones, laptop computers, set-top boxes, other computing systems, and the like. It should be understood that the functionality of one or more of the edge devices 102 can be provided by a single device, by two or more similar devices, and/or by two or more dissimilar devices. For purposes of describing the concepts and technologies disclosed herein, the edge devices 102 are described herein as a server computer. It should be understood that this embodiment is illustrative, and should not be construed as being limiting in any way.

The edge devices 102 can execute an operating system (not illustrated in FIG. 1) and one or more application programs such as, for example, a prefix list management application 106 (labeled "PLMA 106" in FIG. 1). The operating system can include a computer program for controlling the operation of the edge devices 102. The prefix list management application 106 can include one or more executable program that can be configured to execute on top of the operating system to provide various functions as illustrated and described herein for managing prefix lists. In particular, a particular edge device 102, e.g., the edge device 102A, can be configured to execute the prefix list management application 106 to manage a version of a BGP table, routing table, or BGP prefix list 108A-N (hereinafter collectively and/or generically referred to as a "prefix list 108") that can be stored at and/or accessible to the edge device 102A.

Whereas many existing embodiments of the provider networks rely on multiple edge devices 102 storing the same version of a prefix list 108, embodiments of the concepts and technologies disclosed herein enable each edge device 102 to store a custom version of the prefix list 108, as will be illustrated and described in more detail herein. This approach can optimize storage resources associated with the edge devices 102 and improve performance of the edge devices 102, as will be illustrated and described in more detail herein.

In particular, the example of the edge device 102A will be described as being illustrative of the concepts and technologies disclosed herein, but should not be construed as being limiting in any way. The edge device 102A can execute the prefix list management application 106, as noted above. The edge device 102A can store an associated version of the prefix list 108A. At some point in time, the edge device 102A can receive a publication or other data file such as the route data 110 illustrated in FIG. 1. The route data 110 can be provided to the edge devices 102, in some embodiments, by a route reflector 112 and/or other functionality.

The route data 110 can include data or other information (e.g., a table, a file, or other information) that can represent some or all communication routes associated with the provider network (e.g., the routes along which data can be forwarded by the edge devices 102 associated with the common backbone 104). It can be appreciated, however, that a particular edge device 102, for example the edge device 102A, may not forward data to or along all routes that may be represented by the route data 110. For example, the route data 110 may represent thousands or even millions of routes and/or associated addresses (e.g., destination addresses, etc.), while the edge device 102A may forward data along considerably less routes. Thus, it can be appreciated that the edge device 102A may store the prefix list 108A with data that represents all of the routes represented by the route data 110, which may be a waste of storage and/or processing resources if these routes are not used. As such, in some embodiments of the concepts and technologies disclosed herein the prefix list management application 106 can be configured to cause the edge devices 102 to manage their respective prefix lists 108 so that each edge device 102 can store a prefix list 108 that can be optimized for that edge device 102.

According to some embodiments of the concepts and technologies disclosed herein, the prefix list management application 106 can be configured to monitor traffic associated with the edge device 102 that executes the prefix list management application 106 to determine bandwidth allocation and/or usage associated with the edge device 102 and/or associated with one or more addresses or prefixes. For example, the prefix list management application 106 can be configured to detect a traffic flow 114. As shown in FIG. 1, a traffic flow 114 can correspond to a number of packets $P_a$ through $P_n$ (hereinafter collectively and/or generically referred to as "packets P"), which can be sent to and arrive at the edge device 102A from a sending device 116. It can be appreciated that the packets P can be intended for delivery to a destination device 118. Thus, it can be appreciated that the term "route" as used herein can refer to a communication path between a sending device 116 and a destination device 118, or paths or portions of paths between devices along the communication path.

According to some embodiments, the prefix list management application 106 can be configured to count the packets P that are routed by the edge device 102A. The counts generated by the prefix list management application 106 can correspond, in some embodiments, to an absolute count such as, for example, a number of packets that are being routed by the edge device 102A to a particular address such as, for example, an IP address associated with a particular destination device 118. In some other embodiments, the counts generated by the prefix list management application 106 can correspond, for example, to a relative count such as, for example, a percentage of all traffic routed by the edge device 102A that is associated with a particular route or address such as, for example, an IP address associated with a particular destination device 118. Because other types of counts associated with the traffic flow 114 are possible and are contemplated, it should be understood that these examples are illustrative, and therefore should not be construed as being limiting in any way.

Based on the counts, which can be generated in some embodiments by the prefix list management application 106, the edge device 102A can determine if a particular route represented by the route data 110 is to be added or inserted into the prefix list 108A associated with the edge device 102A or if the particular route represented by the route data 110 is to be removed or pruned from the prefix list 108A associated with the edge device 102A. To make this determination, the prefix list management application 106 can be configured, in some embodiments, to evaluate the count against a determined and/or defined threshold. Thus, the prefix list management application 106 can be configured to identify the defined threshold (e.g., by accessing a setting, preference, or other functionality that can define the threshold). In some embodiments, the thresholds can be stored in a memory of the edge device 102, determined and/or output by the prefix list management application 106, and/or otherwise determined at the edge device 102. It should be understood that this example is illustrative, and therefore should not be construed as being limiting in any way.

In some embodiments, for example, the prefix list management application 106 can include and/or can access one or more flow bandwidth thresholds. In some embodiments, for example, the flow bandwidth threshold can be defined as a certain percentage of all flow bandwidth associated with one or more of the edge devices 102. Thus, for example, the prefix list management application 106 can be configured to determine a flow bandwidth associated with a particular destination device 118 (e.g., an address associated with the destination device 118), and to determine if the flow bandwidth associated with that particular destination device 118 meets or exceeds the defined flow bandwidth threshold. In some embodiments, for example, the flow bandwidth threshold imposed by the prefix list management application 106 can correspond to ten percent, e.g., that for any address to be added to and/or allowed to remain in the prefix list 108 associated with a particular edge device 102, that edge device 102 must use ten percent of its total flow bandwidth to support traffic flowing to that address.

Thus, it can be appreciated that the prefix list management application 106 can be configured to add routes represented by the route data 110 only if the associated edge device 102 uses at least ten percent of its flow bandwidth to route traffic to or along that route (e.g., to a destination address associated with that route). Similarly, it can be appreciated that the prefix list management application 106 can be configured to remove or prune routes or addresses included in an associated prefix list 108 if the associated edge device 102 uses less than ten percent of its flow bandwidth to route traffic to or along that particular route (e.g., to a destination address associated with that route). Because other thresholds are possible and are contemplated, it should be understood that the ten percent example is illustrative and should not be construed as being limiting in any way.

In some contemplated embodiments of the concepts and technologies disclosed herein, the flow bandwidth thresholds can be set to five percent, ten percent, twenty percent; forty percent; or even fifty percent; or any percentage up to fifty percent. In some embodiments, the flow bandwidth threshold is not set above fifty percent. In the example embodiment using ten percent, it can be appreciated that an associated prefix list 108 can have no more than ten routes, thereby potentially removing millions of routes from the prefix list 108, while accommodating up to one hundred percent of the traffic routed by the edge device 102. As the various instances of the prefix list management application 106 installed by the edge devices 102 perform these and/or other operations as illustrated and described herein, each edge device 102 can store an optimized prefix list 108. By reducing the size of the prefix list, the prefix list management application 106 can reduce lookup time for routes/addresses in the prefix list, reduce data storage requirements associated with the prefix list, and thereby improve performance of the edge devices 102. It should be understood that this example is illustrative, and therefore should not be construed as being limiting in any way.

As such, embodiments of the concepts and technologies disclosed herein can enable optimization of the prefix lists 108 stored by the edge devices 102, where one or more, or even all, of the edge devices 102 can store a custom prefix list 108 that is optimized for a particular edge device 102 based on usage of the bandwidth associated with that edge device 102. As such, it can be appreciated that traffic arriving at a particular edge device 102 may be destined for an address that is not stored by that edge device 102 (e.g., the associated route may not have been added to, or may have been removed from, the associated prefix list 108). Embodiments of the concepts and technologies disclosed herein can enable routing of a traffic flow 114 received by an edge device 102 where the destination address associated with the traffic flow 114 is not included in the prefix list 108 stored by the edge device 102.

In particular, the edge device 102 can be configured, e.g., by executing the prefix list management application 106, to detect receipt of a packet P associated with a traffic flow 114, do identify a destination address associated with the packet P (e.g., by identifying a destination specified in the header of the packet P), and to determine if the destination address is stored in the local prefix list 108. The prefix list management application 106 can search or query the prefix list 108 for the destination address (or a route associated with the specified destination device 118).

If the destination address is not included in the prefix list 108 stored by that edge device 102 (e.g., a defined threshold of flow bandwidth associated with the edge device 102 may not be satisfied for the destination address and therefore may not have been added to and/or may have been removed from the prefix list 108), the edge device 102 can be configured to route the packet P to a gateway device such as a regional or local gateway router (hereinafter referred to as the "gateway") 120 on the common backbone 104. The gateway 120 can be configured to store a complete prefix list 122, which can include all of the routes represented by the route data 110. As such, the gateway 120 can identify a route for the packet P, and forward the packet P to the destination device 118 via the common backbone 104 and/or one or more other network 124 such as, for example, the Internet. An example of this routing is illustrated in FIG. 1 by the line labeled "path$_1$." It should be understood that this example is illustrative, and therefore should not be construed as being limiting in any way.

If the destination address is included in the prefix list 108 stored by that edge device 102, the edge device 102 can be configured to forward the packet P to the destination device 118 directly (e.g., without going through the gateway 120) via the common backbone and/or one or more other network 124 such as, for example, the Internet. An example of this routing is illustrated in FIG. 1 by the line labeled "path$_2$." It should be understood that this example is illustrative, and therefore should not be construed as being limiting in any way.

The gateway 120 can be configured, in some embodiments, to receive the route data 110 from the route reflector 112. The gateway 120 can use the route data 110 to build the complete prefix list 122. Thus, the gateway 120 can be configured to route packets P associated with the traffic flow 114 if the edge device 102 that received the packets P does not have routing information stored in its prefix list 108. It should be understood that this example is illustrative, and therefore should not be construed as being limiting in any way.

In some embodiments, the prefix list management application 106 also can be configured to periodically, or continuously, monitor a local prefix list 108 to determine if changes should be made to the prefix list 108. For example, the prefix list management application 106 can be configured to determine if routes should be removed from the prefix list 108, added to the prefix list 108, or the like. This determination can be based, for example, on the counting and/or determination of flow bandwidth used for each route in the prefix list 108 and/or in the route data 110 (which can be obtained periodically by the edge device 102). In some embodiments, the prefix list management application 106 can be configured to track changes made to the prefix list 108 and to ensure that the same or similar changes are not made frequently.

For example, in some embodiments the prefix list management application 106 can start a timer job when a route is added to the prefix list 108 and/or removed from the prefix list 108, and that particular route may not be added to or removed from the prefix list 108 again until the timer job expires. It should be understood that this example is illustrative, and therefore should not be construed as being limiting in any way. This embodiment can ensure that when a flow bandwidth for a particular address is near a flow bandwidth threshold, the route will not be repeatedly added and removed, as such functions can impact performance of the edge device 102, which management of the prefix list 108 is supposed to improve. In some other embodiments, the prefix list management application 106 can impose a number of cycles or iterations of route data 110 before changes may be made to the prefix list 108. For example, if a route is removed from the prefix list 108, the prefix list management application 106 can require that multiple releases of route data 110 indicate that the route should be added back to the prefix list 108 before adding the route back to the prefix list 108. It should be understood that this example is illustrative, and therefore should not be construed as being limiting in any way.

In practice, one or more edge devices 102 can be located on a network or a portion of a network. In some embodiments, for example, the one or more edge devices 102 can be located on a common backbone 104 of a communications network such as, for example, a carrier network, a provider network, or the like. The common backbone 104 can also be in communication with another network 124 such as, for example, the Internet. In some embodiments, the common backbone 104 can include one or more gateways 120, which can also be configured for routing of network traffic to and/or from the common backbone 104. Because the concepts and technologies disclosed herein can be employed with various types of networks and/or architectures, it should be understood that the illustrated operating environment 100 shown in FIG. 1 is illustrative and should not be construed as being limiting in any way.

According to various embodiments of the concepts and technologies disclosed herein, one or more (or even all) of the edge devices 102 can be configured to execute an instance of the prefix list management application 106. The prefix list management application 106 can be configured to manage a prefix list 108 associated with a respective edge device 102. For example, as shown in FIG. 1, the edge device 102A can store or access a prefix list 108A; the edge device 102B can store or access a prefix list 108B; and/or the edge device 102N can store or access a prefix list 108N.

According to various embodiments of the concepts and technologies disclosed herein, instead of each edge device 102 storing a common prefix list that reflects all possible routes for a networking environment, some embodiments of the concepts and technologies disclosed herein can enable the management and/or optimization of a prefix list 108 stored at an associated edge device 102.

In particular, a route reflector 112 or other functionality associated with a communications network (e.g., a carrier network or provider network) can be configured to send route data 110 to one or more (or even all) of the edge devices 102. In some embodiments, for example, the route reflector 112 can be configured to publish releases of the route data 110 at intervals, when any route change is detected by the route reflector 112 (e.g., via state change messages, route change messages, or the like), based on events (e.g., adding a new device or route, detecting outages, etc.), and/or at other times and/or under other circumstances. As noted above, the route data 110 can represent and/or define every route associated with the operating environment 100 (e.g., all routes associated with the devices operating on the common backbone 104 and/or other routes). As explained above, the route data 110 can define thousands, hundreds of thousands, or even millions of routes. Storing and/or accessing a prefix list 108 that defines all routes for a common backbone 104 and/or other networking environment can consume large amounts of processing and/or data storage resources associated with the edge devices, and therefore can negatively impact performance of the edge devices 102. Furthermore, a particular edge device 102 may only route traffic to or along only a small number of routes, in practice.

Embodiments of the concepts and technologies disclosed herein can enable management of the prefix lists 108 at the edge devices 102. In some embodiments, the edge devices 102 can execute a prefix list management application 106 that can be configured to manage the prefix lists 108. In particular, one or more (or even all) of the edge devices 102 can execute the prefix list management application 106 to monitor communications associated with the edge devices 102. The prefix list management application 106 can be configured to apply one or more flow bandwidth thresholds to the monitored traffic, for example, by considering only traffic that exceeds a set percentage of all traffic associated with the edge device 102. As noted above, for example, a flow bandwidth threshold of ten percent may be applied to identify destination addresses that account for ten percent or more of the total traffic routed by a particular edge device 102. It should be understood that this example is illustrative, and therefore should not be construed as being limiting in any way.

According to various embodiments of the concepts and technologies disclosed herein, the prefix list management application 106 can identify destination addresses that account for the defined levels of routing, and add a route associated with the destination addresses that account for the defined levels of routing to the prefix list associated with the edge device 102. Similarly, any routes in the prefix list 108 that are not associated with a destination address that accounts for the defined levels of routing for a particular edge device 102 can be removed or pruned from the prefix list 108. As such, in the example of ten percent, it can be appreciated that no more than ten entries will exist in the prefix list 108 associated with a particular edge device 102. Thus, a prefix list 108 having millions of routes or more may be reduced to ten or less routes. Thus, savings in processing and data storage resource usages can be realized by some embodiments of the concepts and technologies disclosed herein. It should be understood that this example is illustrative, and therefore should not be construed as being limiting in any way.

Various embodiments of the concepts and technologies disclosed herein can include a gateway 120 that can be configured to store a complete prefix list 122. In particular, the gateway 120 can be configured to receive the route data 110 from the route reflector 112 at various times, and to update its complete prefix list 122 based on the releases of the route data 110 to ensure that all routes are reflected by the complete prefix list 122. Thus, if a particular edge device 102 receives a traffic flow 114 that is intended for delivery to a particular destination device 118 for which a destination address or route is not included in the associated prefix list 108, the edge device 102 can be configured to route the traffic flow 114 to the gateway 120, the gateway 120 can identify routing for the traffic flow 114, and the gateway 120 can route the traffic flow 114 to the destination device 118 using the information included in the complete prefix list 122. Thus, performance of the edge devices 102 can be improved without affecting delivery of traffic associated with traffic flows 114. These and other features and/or advantages of some embodiments of the concepts and technologies disclosed herein will be illustrated and described in more detail below.

FIG. 1 illustrates three edge devices 102, one common backbone 104, one route reflector 112, one traffic flow 114, one sending device 116, one destination device 118, one gateway 120, and one network 124. It should be understood, however, that various implementations of the operating environment 100 can include one, two, three, or more than three edge devices 102, zero, one, or more than one common backbone 104, zero, one, or more than one route reflector 112, one or more than one traffic flow 114, one or more than one sending device 116, one or more than one destination device 118, zero, one, or more than one gateway 120, and/or zero, one, or more than one network 124. As such, the illustrated embodiment should be understood as being illustrative, and should not be construed as being limiting in any way.

Figure 2:
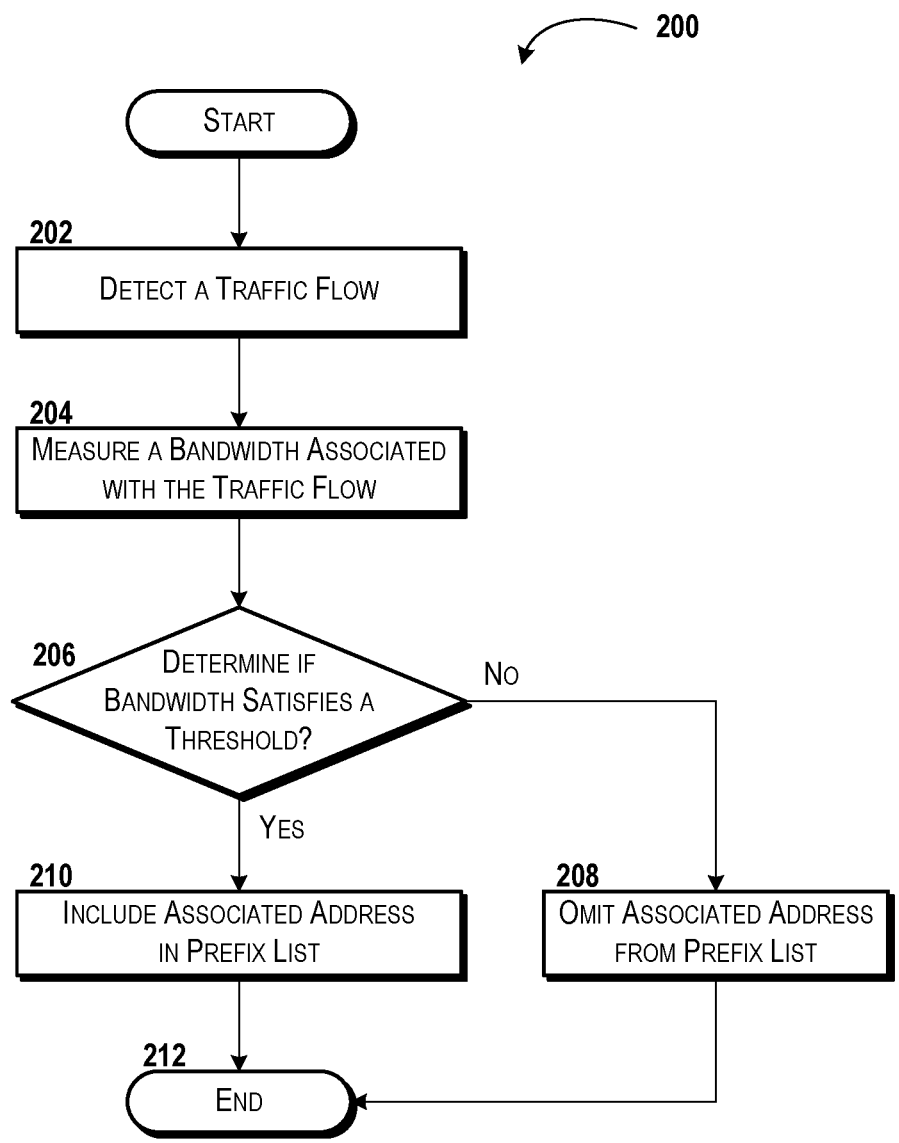
FIG. 2 is a flow diagram showing aspects of a method for managing a prefix list at an edge device, according to an illustrative embodiment of the concepts and technologies described herein.

Turning now to FIG. 2, aspects of a method 200 for managing a prefix list at an edge device will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the edge device 102, to perform one or more operations and/or causing the processor to direct other components of the computing system or device to perform one or more of the operations.

For purposes of illustrating and describing the concepts of the present disclosure, the method 200 is described herein as being performed by the edge device 102 via execution of one or more software modules such as, for example, the prefix list management application 106. It should be understood that additional and/or alternative devices and/or network nodes can provide the functionality described herein via execution of one or more modules, applications, and/or other software including, but not limited to, the prefix list management application 106. Thus, the illustrated embodiments are illustrative, and should not be viewed as being limiting in any way.

The method 200 begins at operation 202. At operation 202, the edge device 102 can detect a traffic flow 114. In some embodiments of the concepts and technologies disclosed herein, the edge device 102 can detect the traffic flow 114 by detecting receipt of a packet P associated with the traffic flow 114, by receiving data associated with the traffic flow 114, and/or otherwise detecting receipt of the traffic flow 114. The traffic flow 114 can be received at the edge device 102 for purposes of routing packets P associated with the traffic flow 114 to a destination device 118. Thus, it can be appreciated that the packets P and/or other data associated with the traffic flow 114 can identify recipients or destinations for the data in the traffic flow 114, e.g., the destination device 118 and/or an address associated with the destination device 118. It should be understood that this example is illustrative, and therefore should not be construed as being limiting in any way.

At operation 204, the edge device 102 can measure a bandwidth associated with the traffic flow 114 detected in operation 202. In some embodiments, the edge device 102 can measure bandwidth associated with one or more traffic flows 114 routed by the edge device 102 to a particular destination. In particular, operation 204 can include the edge device 102 measuring bandwidth used by the edge device 102 to route multiple traffic flows 114 that are directed to a particular destination. Thus, the edge device 102 can determine the bandwidth in operation 204 for multiple traffic flows 114 and not only one traffic flow 114. It should be understood that this example is illustrative, and therefore should not be construed as being limiting in any way.

According to various embodiments, the edge device 102 can use a counter to estimate the bandwidth associated with a particular traffic flow 114 and/or destination. In particular, the edge device 102 can count packets P arriving at the edge device 102 in a particular timeframe, where those packets P are destined for a particular destination (e.g., an address associated with the destination device 118). The edge device 102 can use the counted packets P in the known timeframe to estimate bandwidth of the edge device 102 used to support traffic flows 114 associated with a particular destination device 118 and/or address. It should be understood that this example is illustrative, and therefore should not be construed as being limiting in any way.

From operation 204, the method 200 can proceed to operation 206. At operation 206, the edge device 102 can determine if the flow bandwidth (i.e., the bandwidth associated with the traffic flow(s) 114 as determined in operation 204) satisfies a defined bandwidth threshold. According to various embodiments of the concepts and technologies disclosed herein, a defined bandwidth threshold can be used to identify traffic flows 114 routed by the edge device 102 that meet a defined bandwidth usage threshold. In some embodiments, as noted above, the threshold can correspond to ten percent, or another percentage of total available bandwidth for the edge device 102.

The bandwidth threshold can be set by preferences, settings, and/or other considerations. Thus, it can be appreciated that in some embodiments, the bandwidth threshold applied by multiple edge devices 102 can be the same for the multiple edge devices 102. In some other embodiments, the bandwidth threshold can be dynamically set by the prefix list management application 106 for one or more edge devices 102. Thus, for example, if a particular edge device 102 routes many traffic flows 114, it is possible that a ten percent threshold (for example) may not be satisfied by any particular traffic flow 114.

In some embodiments, for example, the edge device 102 can be configured to adjust its bandwidth threshold to another number or level such as one percent, five percent, or the like. It can be appreciated that the bandwidth threshold can change over time and/or can be adjusted by the edge device 102 (e.g., via execution of the prefix list management application 106) based on the number of routes in a prefix list 108 and/or other considerations. It should be understood that this example is illustrative, and therefore should not be construed as being limiting in any way.

If the edge device 102 determines, in operation 206, that the flow bandwidth (i.e., the bandwidth associated with the traffic flow 114 as determined in operation 204) does not satisfy the defined bandwidth threshold, the method 200 can proceed to operation 208. At operation 208, the edge device 102 can omit the address or route associated with the traffic flow detected in operation 202 from being added to the prefix list 108. In some embodiments, the address may exist in the prefix list 108, so operation 208 can correspond to the edge device 102 removing or pruning the route associated with the destination address from the prefix list 108. Thus, it can be appreciated that a route or address associated with a traffic flow 114 that does not meet a defined bandwidth threshold will be removed from the prefix list 108 or not added to the prefix list 108.

If the edge device 102 determines, in operation 206, that the flow bandwidth (i.e., the bandwidth associated with the traffic flow 114 as determined in operation 204) does satisfy the defined bandwidth threshold, the method 200 can proceed to operation 210. At operation 210, the edge device 102 can add the route associated with the destination address to the prefix list 108. In some embodiments, the address may exist in the prefix list 108, so operation 210 can correspond to the edge device 102 leaving the route or address in the prefix list 108. Thus, it can be appreciated that a route or address associated with a traffic flow 114 that does meet a defined bandwidth threshold will be left in the prefix list 108 or added to the prefix list 108.

From operation 210, the method 200 can proceed to operation 212. The method 200 also can proceed to operation 212 from operation 208. The method 200 can end at operation 212.

Although not separately illustrated in FIG. 2, it should be understood that some embodiments of the method 200 can include receiving the route data 110 as illustrated and described above with reference to FIG. 1. The edge device 102 can receive the route data 110 from the route reflector 112 or another network entity. The route data 110 can include data that can represent and/or define traffic routes for a networking environment such as, for example, the common backbone 104 and/or the network 124. Thus, the route data 110 can represent millions of routes for a particular networking environment.

The edge device 102 can receive an instance or release of the route data 110 and determine, for one or more routes or addresses represented by the route data 110, if the route or address should be added to or removed from the prefix list 108 based on bandwidth usage associated with that route or address. Thus, for example, another embodiment of the method 200 can include the operations of measuring bandwidths for multiple traffic flows 114, receiving route data 110, identifying a route or address represented by the route data 110, and determining, for the identified route, if a bandwidth associated with that route or address satisfies the defined threshold. Thus, another embodiment of the method 200 can include adding or removing addresses or routes from the prefix list 108 based on bandwidth associated with the addresses or routes. It should be understood that this example is illustrative, and therefore should not be construed as being limiting in any way.

Figure 3:
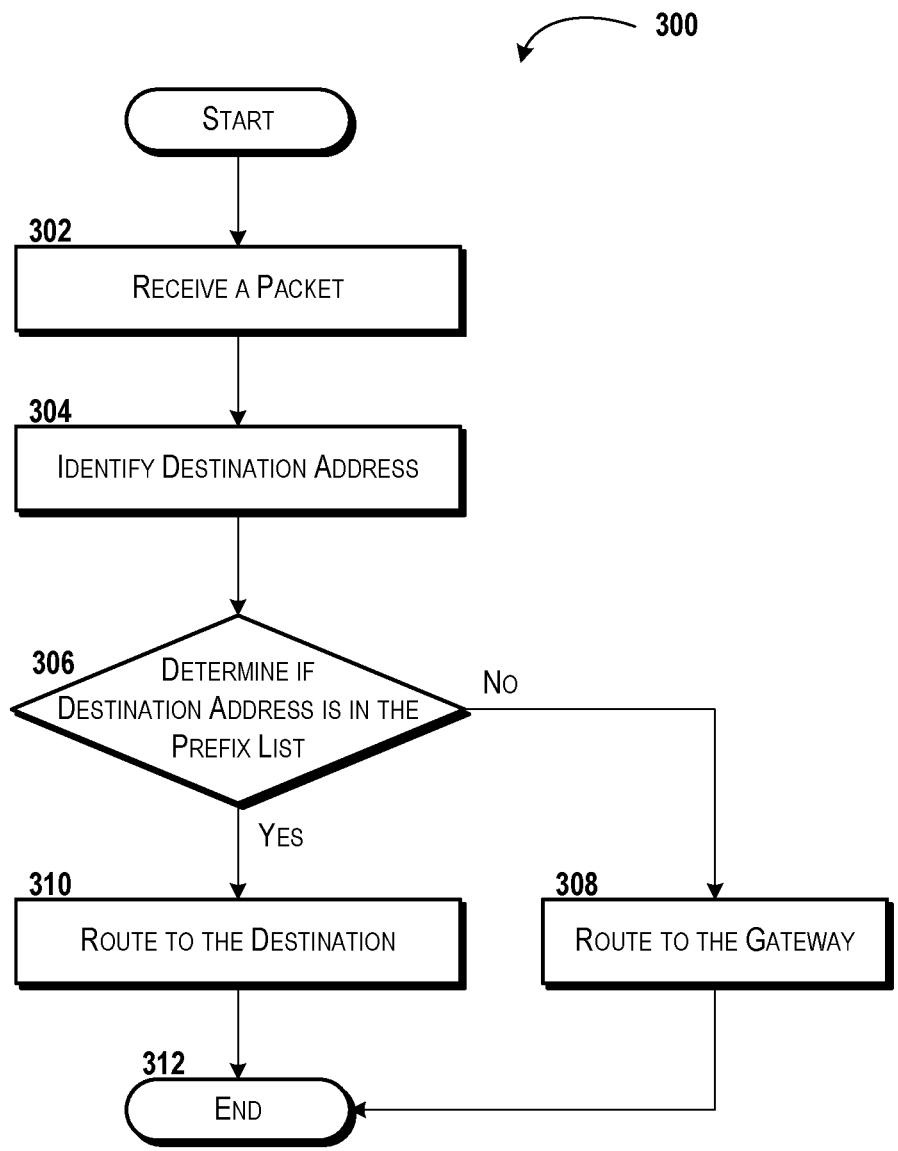
FIG. 3 is a flow diagram showing aspects of a method for routing a packet using a prefix list that is managed at an edge device, according to an illustrative embodiment of the concepts and technologies described herein.

Turning now to FIG. 3, aspects of a method 300 for routing a packet using a prefix list that is managed at an edge device will be described in detail, according to an illustrative embodiment. For purposes of illustrating and describing the concepts of the present disclosure, the method 300 is described herein as being performed by the edge device 102 via execution of one or more software modules such as, for example, the prefix list management application 106. It should be understood that additional and/or alternative devices and/or network nodes can provide the functionality described herein via execution of one or more modules, applications, and/or other software including, but not limited to, the prefix list management application 106. Thus, the illustrated embodiments are illustrative, and should not be viewed as being limiting in any way.

The method 300 begins at operation 302. At operation 302, the edge device 102 can receive a packet P, for example a packet P associated with a traffic flow such as the traffic flow 114. According to various embodiments of the concepts and technologies disclosed herein, the packet P received in operation 302 can include data (e.g., in a header or payload) that can identify an address associated with the packet P. For example, the packet P can identify a destination IP address associated with an intended recipient of the traffic flow 114.

From operation 302, the method 300 can proceed to operation 304. At operation 304, the edge device 102 can identify a destination address associated with the packet P. In some embodiments, for example, operation 304 can include the edge device 102 examining the header or other portion of the packet P received in operation 302 to identify the destination and/or destination address. Because identifying a destination for a packet P is generally understood, this functionality of the edge device 102 will not be further explained here.

From operation 304, the method 300 can proceed to operation 306. At operation 306, the edge device 102 can determine if a destination address associated with the packet received in operation 302 is included in the prefix list 108 associated with (e.g., stored at or accessible to) the edge device 102. In various embodiments, the edge device 102 can search the prefix list 108 for the destination address and/or a route associated with the destination address. It should be understood that in operation 306, the edge device 102 does not have to access the destination address and/or a route associated with the destination address in all embodiments, rather, the edge device 102 can be configured to determine if the route and/or destination address is stored in included in the prefix list 108 in operation 306. It should be understood that this example is illustrative, and therefore should not be construed as being limiting in any way.

If the edge device 102 determines, in operation 306, that the destination address associated with the packet P received in operation 302 is not included in the prefix list 108 associated with the edge device 102, the method 300 can proceed to operation 308. At operation 308, the edge device 102 can forward or route the packet P received in operation 302 to the gateway 120 or otherwise route the packet P in accordance with a default routing mechanism for such instances (where the destination address and/or route is not included in the prefix list). As explained above, the gateway 120 can be configured to store the complete prefix list 122, and therefore can be enabled to route the packet P to its destination. It should be understood that this example is illustrative, and therefore should not be construed as being limiting in any way.

If the edge device 102 determines, in operation 306, that the destination address associated with the packet P received in operation 302 is included in the prefix list 108 associated with the edge device 102, the method 300 can proceed to operation 310. At operation 310, the edge device 102 can route the packet P received in operation 302 to the destination device 118. Thus, it can be appreciated that the edge device 102 can be configured to route the packet P to its destination directly and/or via the gateway 120.

From operation 310, the method 300 can proceed to operation 312. The method 300 also can proceed to operation 312 from operation 308. The method 300 can end at operation 312.

Figure 4:
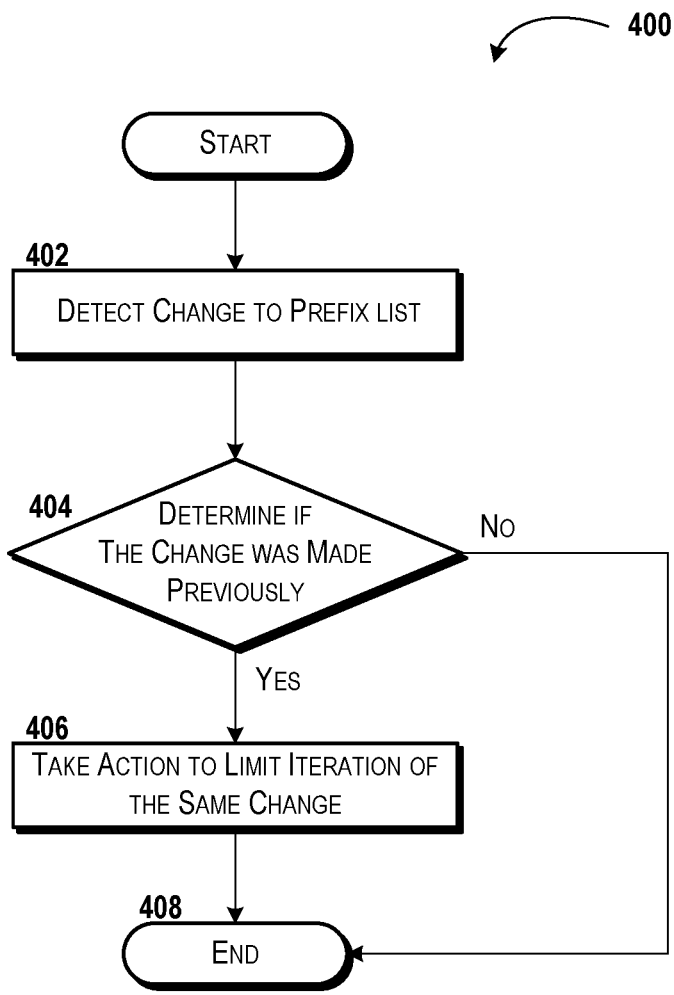
FIG. 4 is a flow diagram showing aspects of a method for managing a prefix list at an edge device, according to another illustrative embodiment of the concepts and technologies described herein.

Turning now to FIG. 4, aspects of a method 400 for managing a prefix list at an edge device will be described in detail, according to an illustrative embodiment. For purposes of illustrating and describing the concepts of the present disclosure, the method 400 is described herein as being performed by the edge device 102 via execution of one or more software modules such as, for example, the prefix list management application 106. It should be understood that additional and/or alternative devices and/or network nodes can provide the functionality described herein via execution of one or more modules, applications, and/or other software including, but not limited to, the prefix list management application 106. Thus, the illustrated embodiments are illustrative, and should not be viewed as being limiting in any way.

The method 400 begins at operation 402. At operation 402, the edge device 102 can detect a change to the prefix list 108 associated with the edge device 102. According to various embodiments of the concepts and technologies disclosed herein, the change detected in operation 402 can correspond to the insertion or addition of a route or address to the prefix list 108, the removal from and/or omission of an address or route from the prefix list 108, or the like. Thus, the edge device 102 can be configured to track the state of the prefix list 108 and can be configured to determine if any change has been made to the prefix list 108 at any time. It should be understood that this example is illustrative, and therefore should not be construed as being limiting in any way.

From operation 402, the method 400 can proceed to operation 404. At operation 404, the edge device 102 can determine if the change detected in operation 402 is related to, corresponds to, is the reverse of, and/or is the same as a change that was previously made to the prefix list 108. For example, if the change detected in operation 402 corresponds to the removal or pruning of an address from the prefix list 108, the edge device 102 can determine, in operation 404, if the same address was previously added to the prefix list 108. Thus, operation 404 can correspond to the edge device 102 determining, for any change to the prefix list 108, if the address or route associated with that change has been the subject of a previous change to the prefix list 108.

In some embodiments of the operation 404, the edge device 102 can be configured to only consider subsequent changes to be the same as previous changes if the changes were made within a particular time (e.g., one minute, one hour, one day, one week, etc.) of each other. In some other embodiments, any repeated change (or reversed change) can be considered in operation 404. Embodiments of the concepts and technologies disclosed herein can track repeated or reversed changes because such changes to the prefix list 108 can consume processing and/or data storage resources that otherwise could be dedicated to routing of traffic. As such, embodiments of the concepts and technologies disclosed herein may use operation 404 to reduce resource consumption associated with maintaining the prefix list 108. It should be understood that this example is illustrative, and therefore should not be construed as being limiting in any way.

If the edge device 102 determines, in operation 404, that the change detected in operation 402 is related to, corresponds to, is the reverse of, and/or is the same as a change that was previously made to the prefix list 108, the method 400 can proceed to operation 406. At operation 406, the edge device 102 can take an action to limit or prevent another iteration of the same change.

In some embodiments, the edge device 102 can be configured (e.g., via execution of the prefix list management application 106) to enforce a timer or time limitation against similar or related changes to the prefix list 108. Thus, for example, the edge device 102 can be configured to start a timer when a change is made to the prefix list 108, or to mark the time of such a change in a log or in the prefix list 108 itself, to track the times that changes are made to the prefix list 108.

Thus, operation 406 can correspond to the edge device 102 staring a timer, inserting a timestamp in the prefix list 108, adding a timestamp to a log associated with the prefix list 108, or otherwise logging the time that a change to the prefix list 108 was made. Future changes that are indicated for an address, device, or route associated with the change detected in operation 402 may be disallowed unless the timer has expired, unless a set time threshold between changes is satisfied, or the like. It should be understood that this example is illustrative, and therefore should not be construed as being limiting in any way.

In some other embodiments, the edge device 102 can be configured (e.g., via execution of the prefix list management application 106) to count releases of route data 110 and/or the number of traffic flows 114 routed by the edge device 102 to the address associated with the change to the prefix list 108. The edge device 102 can be configured to limit the changes to the prefix list 108, in some embodiments, based on the number of releases of route data 110 and/or the number of routed traffic flows 114 associated with an address associated with the change detected in operation 402.

Thus, operation 406 can correspond to the edge device 102 incrementing a counter associated with the change detected in operation 402 (e.g., a change associated with a particular address, device, route, etc.). The edge device 102 can be configured to store the count in the prefix list 108, in a log associated with the prefix list 108, or elsewhere. Future changes that are indicated for an address, device, or route associated with the change detected in operation 402 may be disallowed unless the counter has met a specified count threshold between changes (e.g., the edge device 102 may only make a future change to the prefix list 108 for entries that relate to particular route, device, or address where such changes have been indicated a certain number of times such as, for example, three times, five times, etc.).

Such an approach can help reduce the adding and subsequent removal (or removal and subsequent addition of) the same record to/from the prefix list 108 where an observed flow bandwidth associated with the address, device, or route is very close to a defined flow bandwidth threshold. It should be understood that this example is illustrative, and therefore should not be construed as being limiting in any way.

In some other embodiments, the edge device 102 can be configured (e.g., via execution of the prefix list management application 106) to determine a degree or amount by which a flow bandwidth threshold must be satisfied or not satisfied in the future to reverse or repeat a particular change to the prefix list 108. The edge device 102 can be configured to limit repeated or reversed changes to the prefix list 108, in some embodiments, based on an amount by which or a degree to which the flow bandwidth threshold is satisfied or not satisfied.

By way of example, if a flow bandwidth threshold is set to ten percent to make a change to the prefix list 108, the edge device 102 may impose a new percentage for that threshold (or a percentage of the threshold) for repeated or reversed changes. For example, after an address is added to or removed from the prefix list 108 under the ten percent example flow bandwidth threshold, future changes that repeat or reverse this change may be required by the edge device 102 to meet a new flow bandwidth threshold range or percentage such as twenty percent to reverse or repeat the change, effectively meaning that a bandwidth flow would have to fall under eight percent to remove the associated address or route; that a bandwidth flow would have to exceed twelve percent to add the associated address or route; or the like. It should be understood that these examples are illustrative, and therefore should not be construed as being limiting in any way.

Thus, operation 406 can correspond to the edge device 102 modifying the bandwidth flow threshold and/or imposing new limits to the threshold for certain addresses, devices, or routes. Future changes that are indicated for an address, device, or route associated with the change detected in operation 402 may be disallowed unless the new threshold range has been satisfied. Such an approach can help reduce the adding and subsequent removal (or removal and subsequent addition of) the same record to/from the prefix list 108 where an observed flow bandwidth associated with the address, device, or route is very close to a defined flow bandwidth threshold. It should be understood that this example is illustrative, and therefore should not be construed as being limiting in any way.

From operation 406, the method 400 can proceed to operation 408. The method 400 also can proceed to operation 408 from operation 404 if the edge device 102 determines, in operation 404, that the change detected in operation 402 is not related to, does not correspond to, and/or is not the same as a change that was previously made to the prefix list 108. The method 400 can end at operation 408.

Figure 5:
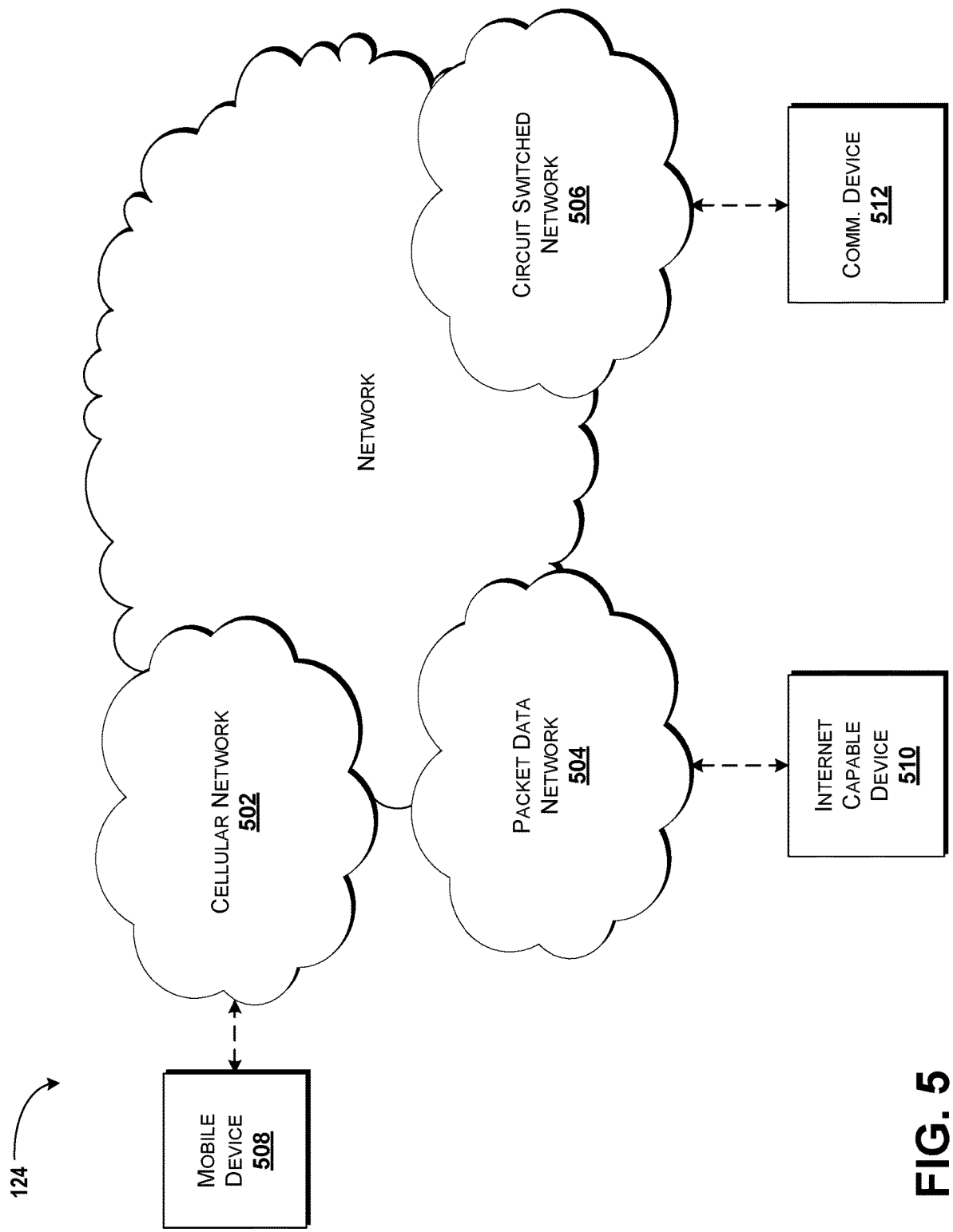
FIG. 5 schematically illustrates a network, according to an illustrative embodiment of the concepts and technologies described herein.

Turning now to FIG. 5, additional details of the network 124 are illustrated, according to an illustrative embodiment. The network 124 includes a cellular network 502, a packet data network 504, for example, the Internet, and a circuit switched network 506, for example, a publicly switched telephone network ("PSTN"). The cellular network 502 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, a cellular telephone, a user equipment, a mobile terminal, a PDA, a laptop computer, a handheld computer, and combinations thereof, can be operatively connected to the cellular network 502. The cellular network 502 can be configured as a 2G GSM network and can provide data communications via GPRS and/or EDGE. Additionally, or alternatively, the cellular network 502 can be configured as a 3G UMTS network and can provide data communications via the HSPA protocol family, for example, HSDPA, EUL (also referred to as HSDPA), and HSPA+. The cellular network 502 also is compatible with 4G and 5G mobile communications standards as well as evolved and future mobile standards.

The packet data network 504 includes various devices, for example, servers, computers, databases, and other devices in communication with one another, as is generally known. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system (POTS). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable devices 510, for example, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510. In the specification, the network 124 is used to refer broadly to any combination of the networks 502, 504, 506. It should be appreciated that substantially all of the functionality described with reference to the network 124 can be performed by the cellular network 502, the packet data network 504, and/or the circuit switched network 506, alone or in combination with other networks, network elements, and the like.

FIG. 6 is a block diagram illustrating a computer system 600 configured to provide the functionality described herein for managing prefix lists at edge devices, in accordance with various embodiments of the concepts and technologies disclosed herein. The computer system 600 includes a processing unit 602, a memory 604, one or more user interface devices 606, one or more input/output ("I/O") devices 608, and one or more network devices 610, each of which is operatively connected to a system bus 612. The bus 612 enables bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 604 communicates with the processing unit 602 via the system bus 612. In some embodiments, the memory 604 is operatively connected to a memory controller (not shown) that enables communication with the processing unit 602 via the system bus 612. The memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 616 may include various software and/or program modules described herein. In some embodiments, for example, the program modules 616 include the prefix list management application 106. This and/or other programs can be embodied in computer-readable media containing instructions that, when executed by the processing unit 602, perform one or more of the methods 200, 300, and 400 described in detail above with respect to FIGS. 2-4 and/or other functionality as illustrated and described herein. It can be appreciated that, at least by virtue of the instructions embodying the methods 200, 300, and 400 and/or other functionality illustrated and described herein being stored in the memory 604 and/or accessed and/or executed by the processing unit 602, the computer system 600 is a special-purpose computing system that can facilitate providing the functionality illustrated and described herein. According to embodiments, the program modules 616 may be embodied in hardware, software, firmware, or any combination thereof. Although not shown in FIG. 6, it should be understood that the memory 604 also can be configured to store the prefix lists 108, the route data 110, the traffic flow 114 and/or the packets P associated therewith, the complete prefix list 122, and/or other data, if desired.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes only non-transitory embodiments of computer readable media as illustrated and described herein. Thus, computer storage media can include volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrase "computer storage medium" and variations thereof does not include waves or signals per se and/or communication media.

The user interface devices 606 may include one or more devices with which a user accesses the computer system 600. The user interface devices 606 may include, but are not limited to, computers, servers, personal digital assistants, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer system 600 to communicate with other networks or remote systems via a network, such as the common backbone 104 and/or the network 124. Examples of the network devices 610 include, but are not limited to, a modem, a radio frequency ("RF") or infrared ("IR") transceiver, a telephonic interface, a bridge, a router, or a network card. The network 124 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such as a WiMAX network, or a cellular network. Alternatively, the network 124 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

FIG. 7 illustrates an illustrative architecture for a cloud computing platform 700 that can be capable of executing the software components described herein for managing prefix lists at edge devices and/or for interacting with the prefix list management application 106. Thus, it can be appreciated that in some embodiments of the concepts and technologies disclosed herein, the cloud computing platform 700 illustrated in FIG. 7 can be used to provide the functionality described herein with respect to the edge devices 102, the sending device 116, the destination device 118, the gateway 120, or other devices illustrated and described herein.

The cloud computing platform 700 thus may be utilized to execute any aspects of the software components presented herein. Thus, according to various embodiments of the concepts and technologies disclosed herein, the prefix list management application 106 can be implemented, at least in part, on or by elements included in the cloud computing platform 700 illustrated and described herein. Those skilled in the art will appreciate that the illustrated cloud computing platform 700 is a simplification of but only one possible implementation of an illustrative cloud computing platform, and as such, the illustrated cloud computing platform 700 should not be construed as being limiting in any way.

In the illustrated embodiment, the cloud computing platform 700 can include a hardware resource layer 702, a virtualization/control layer 704, and a virtual resource layer 706. These layers and/or other layers can be configured to cooperate with each other and/or other elements of a cloud computing platform 700 to perform operations as will be described in detail herein. While connections are shown between some of the components illustrated in FIG. 7, it should be understood that some, none, or all of the components illustrated in FIG. 7 can be configured to interact with one another to carry out various functions described herein. In some embodiments, the components are arranged so as to communicate via one or more networks such as, for example, the common backbone 104 and/or the network 124 illustrated and described hereinabove (not shown in FIG. 7). Thus, it should be understood that FIG. 7 and the following description are intended to provide a general understanding of a suitable environment in which various aspects of embodiments can be implemented, and should not be construed as being limiting in any way.

The hardware resource layer 702 can provide hardware resources. In the illustrated embodiment, the hardware resources can include one or more compute resources 708, one or more memory resources 710, and one or more other resources 712. The compute resource(s) 708 can include one or more hardware components that can perform computations to process data, and/or to execute computer-executable instructions of one or more application programs, operating systems, services, and/or other software including, but not limited to, the prefix list management application 106 illustrated and described herein.

According to various embodiments, the compute resources 708 can include one or more central processing units ("CPUs"). The CPUs can be configured with one or more processing cores. In some embodiments, the compute resources 708 can include one or more graphics processing units ("GPUs"). The GPUs can be configured to accelerate operations performed by one or more CPUs, and/or to perform computations to process data, and/or to execute computer-executable instructions of one or more application programs, operating systems, and/or other software that may or may not include instructions that are specifically graphics computations and/or related to graphics computations. In some embodiments, the compute resources 708 can include one or more discrete GPUs. In some other embodiments, the compute resources 708 can include one or more CPU and/or GPU components that can be configured in accordance with a co-processing CPU/GPU computing model. Thus, it can be appreciated that in some embodiments of the compute resources 708, a sequential part of an application can execute on a CPU and a computationally-intensive part of the application can be accelerated by the GPU. It should be understood that this example is illustrative, and therefore should not be construed as being limiting in any way.

In some embodiments, the compute resources 708 also can include one or more system on a chip ("SoC") components. It should be understood that an SoC component can operate in association with one or more other components as illustrated and described herein, for example, one or more of the memory resources 710 and/or one or more of the other resources 712. In some embodiments in which an SoC component is included, the compute resources 708 can be or can include one or more embodiments of the SNAPDRAGON brand family of SoCs, available from QUALCOMM of San Diego, Calif.; one or more embodiment of the TEGRA brand family of SoCs, available from NVIDIA of Santa Clara, Calif.; one or more embodiment of the HUMMINGBIRD brand family of SoCs, available from SAMSUNG of Seoul, South Korea; one or more embodiment of the Open Multimedia Application Platform ("OMAP") family of SoCs, available from TEXAS INSTRUMENTS of Dallas, Tex.; one or more customized versions of any of the above SoCs; and/or one or more other brand and/or one or more proprietary SoCs.

The compute resources 708 can be or can include one or more hardware components arranged in accordance with an ARM architecture, available for license from ARM HOLDINGS of Cambridge, United Kingdom. Alternatively, the compute resources 708 can be or can include one or more hardware components arranged in accordance with an x86 architecture, such as an architecture available from INTEL CORPORATION of Mountain View, Calif., and others. Those skilled in the art will appreciate the implementation of the compute resources 708 can utilize various computation architectures and/or processing architectures. As such, the various example embodiments of the compute resources 708 as mentioned hereinabove should not be construed as being limiting in any way. Rather, implementations of embodiments of the concepts and technologies disclosed herein can be implemented using compute resources 708 having any of the particular computation architecture and/or combination of computation architectures mentioned herein as well as other architectures.

Although not separately illustrated in FIG. 7, it should be understood that the compute resources 708 illustrated and described herein can host and/or execute various services, applications, portals, and/or other functionality illustrated and described herein. Thus, the compute resources 708 can host and/or can execute the prefix list management application 106 or other applications or services illustrated and described herein.

The memory resource(s) 710 can include one or more hardware components that can perform or provide storage operations, including temporary and/or permanent storage operations. In some embodiments, the memory resource(s) 710 can include volatile and/or non-volatile memory implemented in any method or technology for storage of information such as computer-readable instructions, data structures, program modules, or other data disclosed herein. Computer storage media is defined hereinabove and therefore should be understood as including, in various embodiments, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium that can be used to store data and that can be accessed by the compute resources 708, subject to the definition of "computer storage media" provided above (e.g., as excluding waves and signals per se and/or communication media as defined in this application).

Although not illustrated in FIG. 7, it should be understood that the memory resources 710 can host or store the various data illustrated and described herein including, but not limited to, the prefix lists 108, the route data 110, the traffic flow 114 and/or the packets P associated therewith, the complete prefix list 122, and/or other data, if desired. It should be understood that this example is illustrative, and therefore should not be construed as being limiting in any way.

The other resource(s) 712 can include any other hardware resources that can be utilized by the compute resources(s) 708 and/or the memory resource(s) 710 to perform operations. The other resource(s) 712 can include one or more input and/or output processors (e.g., a network interface controller and/or a wireless radio), one or more modems, one or more codec chipsets, one or more pipeline processors, one or more fast Fourier transform ("FFT") processors, one or more digital signal processors ("DSPs"), one or more speech synthesizers, combinations thereof, or the like.

The hardware resources operating within the hardware resource layer 702 can be virtualized by one or more virtual machine monitors ("VMMs") 714A-714N (also known as "hypervisors;" hereinafter "VMMs 714"). The VMMs 714 can operate within the virtualization/control layer 704 to manage one or more virtual resources that can reside in the virtual resource layer 706. The VMMs 714 can be or can include software, firmware, and/or hardware that alone or in combination with other software, firmware, and/or hardware, can manage one or more virtual resources operating within the virtual resource layer 706.

The virtual resources operating within the virtual resource layer 706 can include abstractions of at least a portion of the compute resources 708, the memory resources 710, the other resources 712, or any combination thereof. These abstractions are referred to herein as virtual machines ("VMs"). In the illustrated embodiment, the virtual resource layer 706 includes VMs 716A-716N (hereinafter "VMs 716").

Based on the foregoing, it should be appreciated that systems and methods for managing prefix lists at edge devices have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A system comprising:
   an edge device comprising a processor; and
   a memory that stores computer-executable instructions that, when executed by the processor, cause the processor to perform operations comprising
   detecting a traffic flow, wherein the traffic flow comprises a packet that specifies a destination address,
   measuring a bandwidth associated with the traffic flow,
   identifying a flow bandwidth threshold defined for the edge device, the flow bandwidth threshold comprising a percentage of a total bandwidth of the edge device,
   determining if the bandwidth associated with the traffic flow exceeds the flow bandwidth threshold,
   if a determination is made that the bandwidth associated with the traffic flow exceeds the flow bandwidth threshold, including the destination address in a prefix list stored at the edge device,
   if a determination is made that the bandwidth associated with the traffic flow does not exceed the flow bandwidth threshold, omitting the destination address from the prefix list stored at the edge device,
   receiving a further packet,
   identifying a further destination address for the further packet,
   determining if the further destination address is included in the prefix list,
   if a determination is made that the further destination address is included in the prefix list, routing the further packet to a destination device associated with the further destination address, and
   if a determination is made that the further destination address is not included in the prefix list, routing the further packet to a gateway device, wherein the gateway device is configured to route the further packet in accordance with routing information stored in a complete prefix list stored at the gateway device.

2. The system of claim 1, wherein the bandwidth comprises a count of packets included in the traffic flow.

3. The system of claim 1, wherein the bandwidth comprises a count of packets associated with the traffic flow and a further count of packets associated with a further traffic flow that comprises the further packet.

4. The system of claim 1, wherein including the destination address in the prefix list comprises adding the destination address to the prefix list.

5. The system of claim 1, wherein omitting the destination address from the prefix list comprises removing the destination address from the prefix list.

6. The system of claim 1, wherein the computer-executable instructions, when executed by a processor, cause the processor to perform operations further comprising:
   detecting a change to the prefix list;
   determining if the change has previously been made to the prefix list; and
   in response to a determination that the change has previously been made to the prefix list, taking an action to limit a future iteration of the change.

7. The system of claim 6, wherein taking the action comprises:
   tracking a time associated with the change, wherein the future iteration of the change is not made before a defined time has passed since the change;
   counting releases of traffic flows, wherein the future iteration of the change is not made before a defined number of traffic flows have been detected since the change; or
   requiring a measured bandwidth to satisfy the flow bandwidth threshold by a defined amount before the future iteration of the change is made.

8. A method comprising:
   detecting, at an edge device that comprises a processor, a traffic flow, wherein the traffic flow comprises a packet that specifies a destination address;
   measuring, by the edge device, a bandwidth associated with the traffic flow;
   identifying, by the edge device, a flow bandwidth threshold defined for the edge device, the flow bandwidth threshold comprising a percentage of a total bandwidth of the edge device;
   determining, by the edge device, if the bandwidth associated with the traffic flow exceeds the flow bandwidth threshold;
   if a determination is made that the bandwidth associated with the traffic flow exceeds the flow bandwidth threshold, including, by the edge device, the destination address in a prefix list stored at the edge device;
   if a determination is made that the bandwidth associated with the traffic flow does not exceed the flow bandwidth threshold, omitting, by the edge device, the destination address from the prefix list stored at the edge device;
   receiving, by the edge device, a further packet;
   identifying, by the edge device, a further destination address for the further packet;
   determining, by the edge device, if the further destination address is included in the prefix list;
   if a determination is made that the further destination address is included in the prefix list, routing, by the edge device, the further packet to a destination device associated with the further destination address; and if a determination is made that the further destination address is not included in the prefix list, routing, by the edge device, the further packet to a gateway device, wherein the gateway device is configured to route the further packet in accordance with routing information stored in a complete prefix list stored at the gateway device.

9. The method of claim 8, wherein the bandwidth comprises a count of packets associated with the traffic flow and a further count of packets associated with a further traffic flow that comprises the further packet.

10. The method of claim 8, wherein including the destination address in the prefix list comprises adding the destination address to the prefix list, and wherein omitting the destination address from the prefix list comprises removing the destination address from the prefix list.

11. The method of claim 8, further comprising:
 detecting a change to the prefix list;
 determining if the change has previously been made to the prefix list; and
 in response to a determination that the change has previously been made to the prefix list, taking an action to limit a future iteration of the change.

12. The method of claim 11, wherein taking the action comprises:
 tracking a time associated with the change, wherein the future iteration of the change is not made before a defined time has passed since the change;
 counting releases of traffic flows, wherein the future iteration of the change is not made before a defined number of traffic flows have been detected since the change; or
 requiring a measured bandwidth to satisfy the flow bandwidth threshold by a defined amount before the future iteration of the change is made.

13. A computer storage medium having computer-executable instructions stored thereon that, when executed by a processor, cause the processor to perform operations comprising:
 detecting, at an edge device, a traffic flow, wherein the traffic flow comprises a packet that specifies a destination address;
 measuring a bandwidth associated with the traffic flow;
 identifying a flow bandwidth threshold defined for the edge device, the flow bandwidth threshold comprising a percentage of a total bandwidth of the edge device;
 determining if the bandwidth associated with the traffic flow exceeds the flow bandwidth threshold;
 if a determination is made that the bandwidth associated with the traffic flow exceeds the flow bandwidth threshold, including the destination address in a prefix list stored at the edge device; and
 if a determination is made that the bandwidth associated with the traffic flow does not exceed the flow bandwidth threshold, omitting the destination address from the prefix list stored at the edge device;
 receiving a further packet;
 identifying a further destination address for the further packet;
 determining if the further destination address is included in the prefix list;
 if a determination is made that the further destination address is included in the prefix list, routing the further packet to a destination device associated with the further destination address; and
 if a determination is made that the further destination address is not included in the prefix list, routing the further packet to a gateway device, wherein the gateway device is configured to route the further packet in accordance with routing information stored in a complete prefix list stored at the gateway device.

14. The computer storage medium of claim 13, wherein the bandwidth comprises a count of packets included in the traffic flow.

15. The computer storage medium of claim 13, wherein the bandwidth comprises a count of packets associated with the traffic flow and a further count of packets associated with a further traffic flow that comprises the further packet.

16. The computer storage medium of claim 13, wherein including the destination address in the prefix list comprises adding the destination address to the prefix list.

17. The computer storage medium of claim 13, wherein omitting the destination address from the prefix list comprises removing the destination address from the prefix list.

18. The computer storage medium of claim 13, wherein the computer-executable instructions, when executed by a processor, cause the processor to perform operations further comprising:
 detecting a change to the prefix list;
 determining if the change has previously been made to the prefix list; and
 in response to a determination that the change has previously been made to the prefix list, taking an action to limit a future iteration of the change.

19. The computer storage medium of claim 18, wherein taking the action comprises:
 requiring a measured bandwidth to satisfy the flow bandwidth threshold by a defined amount before the future iteration of the change is made.

20. The computer storage medium of claim 18, wherein taking the action comprises:
 tracking a time associated with the change, wherein the future iteration of the change is not made before a defined time has passed since the change; or
 counting releases of traffic flows, wherein the future iteration of the change is not made before a defined number of traffic flows have been detected since the change.

* * * * *